United States Patent
Kim et al.

(10) Patent No.: US 8,284,529 B2
(45) Date of Patent: Oct. 9, 2012

(54) RECLOSING CONTROL SYSTEM AND METHOD USING SUPERCONDUCTING FAULT CURRENT LIMITER

(75) Inventors: Chul Hwan Kim, Seongnam-si (KR);
Sang Bong Rhee, Suwon-si (KR); Hun Chul Seo, Suwon-si (KR); Yun Tae Ko, Jeju-si (KR)

(73) Assignee: Sungkyunkwan University Foundation for Corporation, Suwon-Si (KR)

( * ) Notice: Subject to any disclaimer, the term of this patent is extended or adjusted under 35 U.S.C. 154(b) by 365 days.

(21) Appl. No.: 12/658,140

(22) Filed: Feb. 3, 2010

(65) Prior Publication Data

US 2011/0032650 A1 Feb. 10, 2011

(30) Foreign Application Priority Data

Aug. 7, 2009 (KR) .................. 10-2009-0072627

(51) Int. Cl.
*H02H 7/00* (2006.01)
*H02H 9/00* (2006.01)
*H02H 3/20* (2006.01)
*H02H 9/04* (2006.01)

(52) U.S. Cl. .............................. 361/19; 361/91.1
(58) Field of Classification Search .................... 361/19
See application file for complete search history.

(56) References Cited

U.S. PATENT DOCUMENTS 7,545,611 B2 * 6/2009 Lee et al. .................. 361/19

OTHER PUBLICATIONS

Yan Tae Ko; Development of new reclosing scheme considering the superconducting fault current limiter, International Journal of Control Automation and System; Jul. 14, 2009; p. 135.*
Yun-Tae Ko et al, Development of new reclosing scheme considering the superconducting fault current limiter, International Journal of Control Automation and System, Jul. 14, 2009-Jul. 16, 2009, p. 135, Muju Resort in Korea.

* cited by examiner

*Primary Examiner* — Dharti Patel
(74) *Attorney, Agent, or Firm* — Lexyoume IP Meister, PLLC.

(57) ABSTRACT

The present invention relates to a reclosing control system and method using a superconducting fault current limiter. The reclosing control system includes a superconducting fault current limiting device in which two circuits, each having a switch and a superconducting fault current limiter connected in series with each other, are connected in parallel with each other. A recloser is disposed between the superconducting fault current limiting device and a distribution line and is configured to control reclosing. The distribution line is connected to the recloser and is configured to transfer power to a load.

10 Claims, 10 Drawing Sheets

RECLOSING CONTROL SYSTEM AND METHOD USING SUPERCONDUCTING FAULT CURRENT LIMITER

CROSS-REFERENCE TO RELATED APPLICATION

This application claims priority to and the benefit of Korean Patent Application No. 10-2009-0072627 filed in the Korean Intellectual Property Office on Aug. 7, 2009, the entire contents of which are incorporated herein by reference.

BACKGROUND OF THE INVENTION

1. Field of the Invention

The present invention relates, in general, to a reclosing control system and method using a superconducting fault current limiter, and, more particularly, to a reclosing control system and method using a superconducting fault current limiter, which determine a reclosing time in consideration of the recovery time of a superconducting fault current limiter, thus adjusting the fixed dead time of a conventional scheme.

2. Description of the Related Art

A recloser, which is one of a plurality of protection devices used in a power distribution system, is used to restore the system when a transient fault occurs. In a power distribution system, most faults are transient faults, and thus power quality and reliability can be improved by reclosing.

A conventional recloser has a fixed dead time (for example, 0.5 sec or 15 sec). Such a conventional recloser is designated to perform reclosing after a preset reclosing time has elapsed even if a fault is promptly cleared. Further, a conventional recloser cannot determine whether a current fault is a permanent fault or a transient fault for a dead time even if the fault is cleared, and can merely determine whether the current fault is a permanent fault or a transient fault by using current flowing when the system is closed after the dead time.

In this case, conventional technology for determining whether a transient fault has occurred may include a method of determining the extinction time of secondary arc using the effective value (or root mean square: rms) of a fault voltage and a method of determining the extinction time of secondary arc using the Total Harmonic Distortion (THD) of a fault voltage. These methods are mainly investigated in a power transmission system in which the capacitance of a line is large. In a power distribution system, research into techniques for determining a permanent or transient fault has scarcely been conducted.

Meanwhile, with the large-scale and complexity of a power system, fault current also greatly increases, so that the case where protection devices cannot resist the high fault current and consequently fail to interrupt the high fault current may occur. As a solution for such a case, research into the application of a Superconducting Fault Current Limiter (SFCL) to the power system has recently been widely conducted.

In order to connect the SFCL to the system, protective cooperation with other protection devices must be considered. In the aspect of protective cooperation with a recloser, which needs to be considered, there exist a variety of problems, such as malfunctioning due to the setting of pick-up current and the conflict between recovery time of the SFCL and the reclosing time of the recloser. In a case such as this, the problem of the setting of pick-up current can be easily solved by means of a setting performed when products are manufactured. However, there is a problem because it is difficult to solve the problem of the conflict between the recovery time of the SFCL and the reclosing time of the recloser.

SUMMARY OF THE INVENTION

Accordingly, the present invention has been made keeping in mind the above problems occurring in the prior art, and an object of the present invention is to provide a reclosing control system and method using a superconducting fault current limiter, which determine whether a fault is a permanent fault or a transient fault for a dead time before reclosing, and perform the reclosing considering the recovery time of a superconducting fault current limiter which is connected to the system so as to reduce a fault current if it is determined that the fault is a transient fault.

In accordance with an aspect of the present invention, there is provided a reclosing control system, comprising a superconducting fault current limiting device in which two circuits, each having a switch and a Superconducting Fault Current Limiter (SFCL) connected in series with each other, are connected in parallel with each other; a recloser located between the superconducting fault current limiting device and a distribution line and configured to control reclosing; and the distribution line configured to transfer power to a load, wherein the recloser detects a fault clearing time by applying a carrier signal when a fault occurs on the distribution line, and performs reclosing considering the fault clearing time and a recovery time of a relevant SFCL.

Preferably, the recloser may perform control such that reclosing is performed after the recovery time of the SFCL has elapsed when a sum of the fault clearing time and the recovery time of the SFCL is less than a reference time.

Preferably, the recloser may perform control such that reclosing is performed after switching the SFCL of the superconducting fault current limiting device after the fault has been cleared when the fault clearing time exceeds a reference time.

Preferably, the recloser may perform control such that reclosing is performed after switching the SFCL of the superconducting fault current limiting device after a predetermined period of time has elapsed when the fault clearing time is less than a reference time and a sum of the fault clearing time and the recovery time of the SFCL exceeds the reference time.

Preferably, the distribution line may be connected to a bus to supply power to the load, and the recloser determines whether the fault has been cleared by detecting a carrier signal on the bus. In this case, the recloser may detect the carrier signal by detecting variation in an effective value on the bus.

Preferably, the recloser may determine whether the fault has occurred by checking magnitude of current flowing from the superconducting fault current limiting device to the recloser.

In accordance with another aspect of the present invention, there is provided a reclosing control method using a superconducting fault current limiter, comprising a reclosing control system detecting a fault occurring on a distribution line; the reclosing control system, which detects the fault, tripping the distribution line; the reclosing control system determining whether the fault has been cleared by applying a carrier signal to the distribution line; and the reclosing control system controlling reclosing in consideration of a fault clearing time and a recovery time of a Superconducting Fault Current Limiter (SFCL).

Preferably, the reclosing control system controlling reclosing in consideration of the fault clearing time and the recovery time of the SFCL may be configured to perform control such that reclosing is performed after the recovery time of the SFCL has elapsed when a sum of the fault clearing time and the recovery time of the SFCL is less than a reference time.

Preferably, the reclosing control system controlling reclosing in consideration of the fault clearing time and the recovery time of the SFCL may be configured to perform control such that reclosing is performed after switching the SFCL of the superconducting fault current limiting device after the fault has been cleared when the fault clearing time exceeds a reference time.

Preferably, the reclosing control system controlling reclosing in consideration of the fault clearing time and the recovery time of the SFCL may be configured to perform control such that reclosing is performed after switching the SFCL of the superconducting fault current limiting device after a predetermined period of time has elapsed when the fault clearing time is less than a reference time and a sum of the fault clearing time and the recovery time of the SFCL exceeds the reference time.

Preferably, the reclosing control system determining whether the fault has been cleared by applying the carrier signal to the distribution line may be configured such that the distribution line is connected to a bus to supply power to a load, and a recloser determines whether the fault has been cleared by detecting a carrier signal on the bus. In this case, the reclosing control system detects the carrier signal by using variation in an effective value on the bus.

Preferably, the reclosing control system detecting the fault occurring on a distribution line may be configured to determine whether the fault has occurred by checking magnitude of current flowing through a previous stage of the reclosing control system.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of a reclosing control system and method considering a superconducting fault current limiter according to the present invention will be described in detail with reference to the attached drawings.

Figure 1:
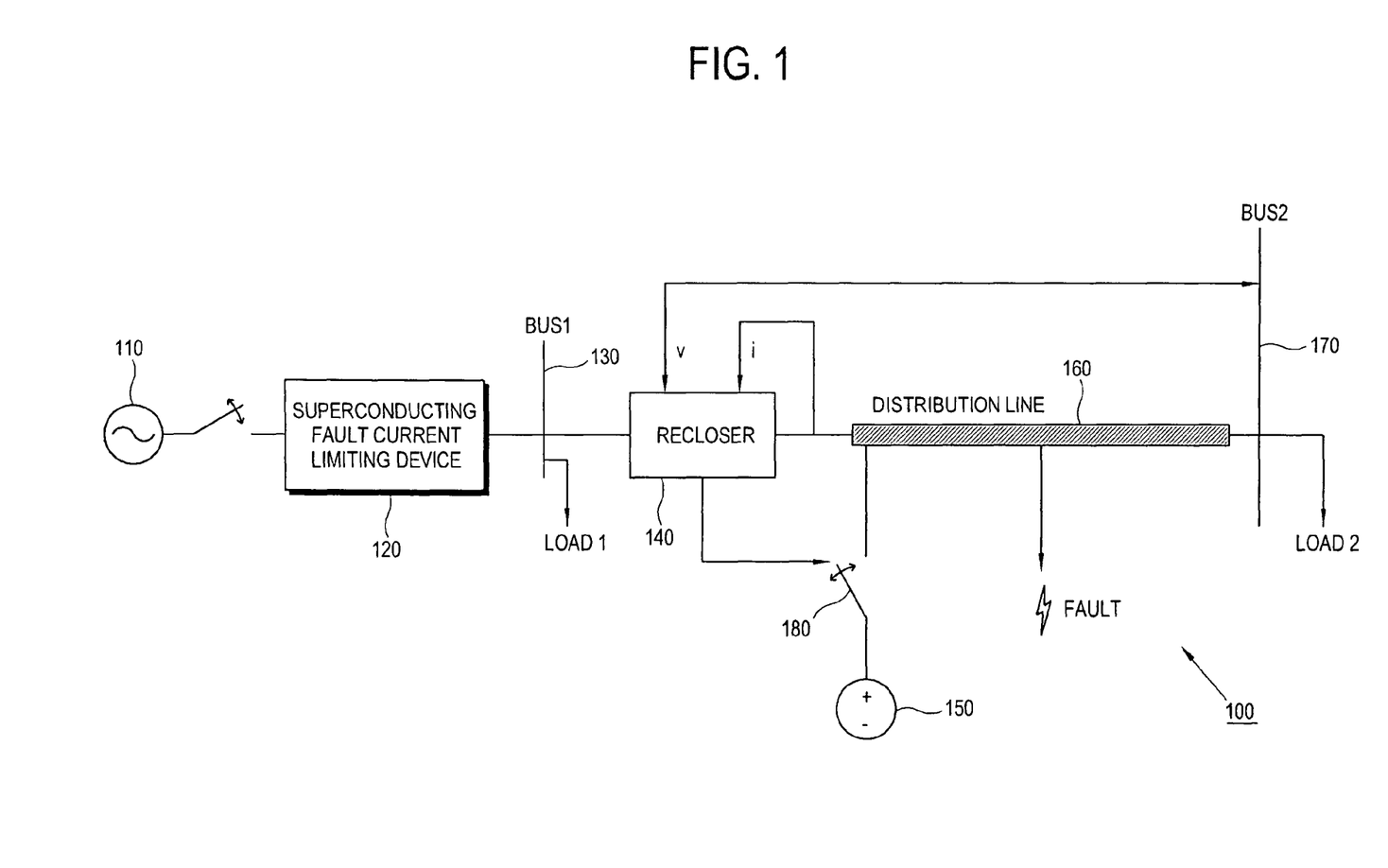
FIG. 1 is a diagram showing the construction of a reclosing control system using a superconducting fault current limiter according to an embodiment of the present invention.

FIG. 1 is a diagram showing the construction of a reclosing control system using a superconducting fault current limiter according to an embodiment of the present invention.

As shown in FIG. 1, a reclosing control system 100 using a superconducting fault current limiter according to the present invention may include a power source 110, a superconducting fault current limiting device 120, a first bus (BUS1) 130, a recloser 140, an Alternating Current (AC) power source 150, a distribution line 160, and a second bus (BUS2) 170.

The superconducting fault current limiting device 120 has characteristics of having an impedance almost close to 0 in the normal operating state of the system, but having a specific impedance when a fault occurs and a fault current greater than the unique threshold current of a superconductor flows through the superconducting fault current limiting device 120, thus decreasing the fault current.

The Superconducting. Fault Current Limiters (SFCLs) 123 and 124 in the superconducting fault current limiting device 120 can be classified into a resistive type and an inductive type according to the type of impedance generated while superconductivity is lost. Further, hybrid fault current limiters in which the use of superconductors is minimized to realize improvements in the economical efficiency and minimization of cooling equipment have recently been developed.

Meanwhile, the recloser 140 is preferably implemented as a recloser used in a power distribution system, and is a protection device used to ensure the reliability and stability of the system and maintain a continuous supply of power. Such a recloser 140 is a device to detect the transient faults which occur on a 22.9 kV distribution line, such as contact with wires or contact with trees attributable to a wind, and in tripping the system. A reclosing scheme currently used in a power distribution system has a dead time of 0.5 sec after the first tripping, and a dead time of 15 sec after the second tripping.

When a fault occurs on the distribution line 160, the recloser 140 closes a third switch 180, thus enabling a carrier signal to be applied to the distribution line 160. The carrier signal flows through the location of the fault and is not detected on the second bus 170 for a fault duration.

When the fault has been cleared, the carrier signal is transmitted through the distribution line 160, and is then detected on the second bus 170. When the carrier signal is detected on the second bus 170, the recloser 140 determines that the fault has cleared, stops the application of the carrier signal, and performs reclosing in consideration of the residual recovery time of the SFCL of the superconducting fault current limiting device 120.

Figure 2:
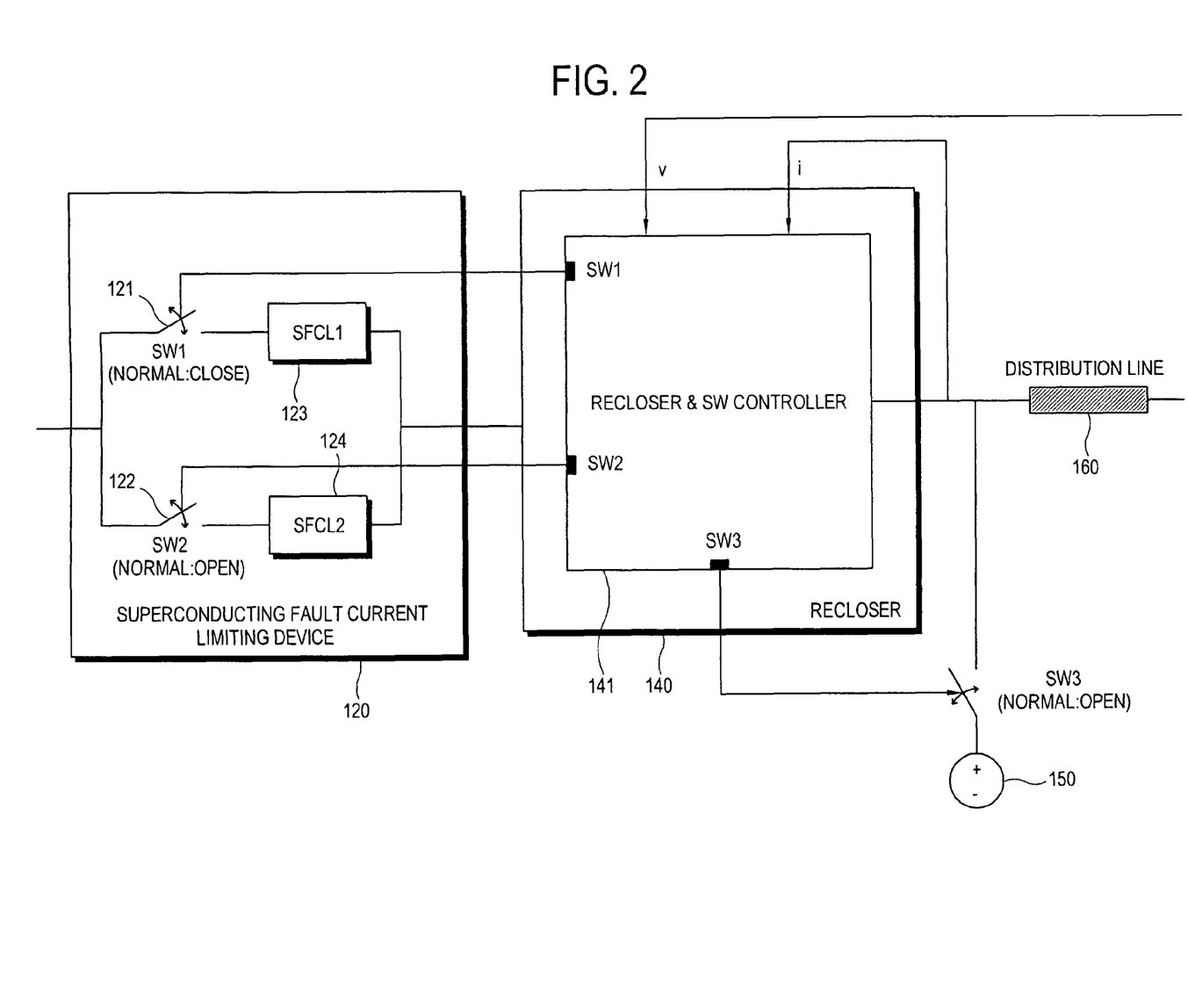
FIG. 2 is a diagram showing the detailed connection between the superconducting fault current limiting device and the recloser of FIG. 1.

FIG. 2 is a diagram showing the detailed connection between the superconducting fault current limiting device and the recloser of FIG. 1.

As shown in FIG. 2, a superconducting fault current limiting device 120 may include a first switch (SW1) 121, a second switch (SW2) 122, a first SFCL (SFCL1) 123, and a second SFCL (SFCL2) 124. A recloser 140 may include a recloser & switch (SW) controller 141.

As shown in FIG. 2, the superconducting fault current limiting device 120 may be configured such that two circuits, each having one switch and one SFCL connected in series with each other, are connected in parallel with each other. The first switch (SW1) connected to the first SFCL (SFCL1) is closed in a normal state, and the second switch (SW2) connected to the second SFCL (SFCL2) is open in the normal state.

The recloser & switch controller 141 of the recloser 140 performs reclosing after connecting the first SFCL 123 or second SFCL 124 to the system by controlling the first and second switches 121 and 122 of the superconducting fault current limiting device 120.

In detail, the recloser & switch controller 141 closes the first switch 121 and opens the second switch 122 in the normal state. In Operation 1 in which a fault occurs, the recloser & switch controller 141 performs reclosing after the residual recovery time of the first or second SFCL has elapsed. Further, in Operations 2 and 3 in which a fault occurs and which will be described later, the recloser & switch controller 141 opens the first switch 121, and closes the second switch 122, thus performing reclosing.

Meanwhile, the recloser & switch controller 141 may perform control such that a carrier signal is applied to the distribution line by closing the third switch 180 when a fault occurs. Thereafter, when the fault is cleared and the carrier signal is detected on a bus (BUS2) 170, the recloser & switch controller 141 may stop applying the carrier signal by opening the third switch 180.

Figure 3:
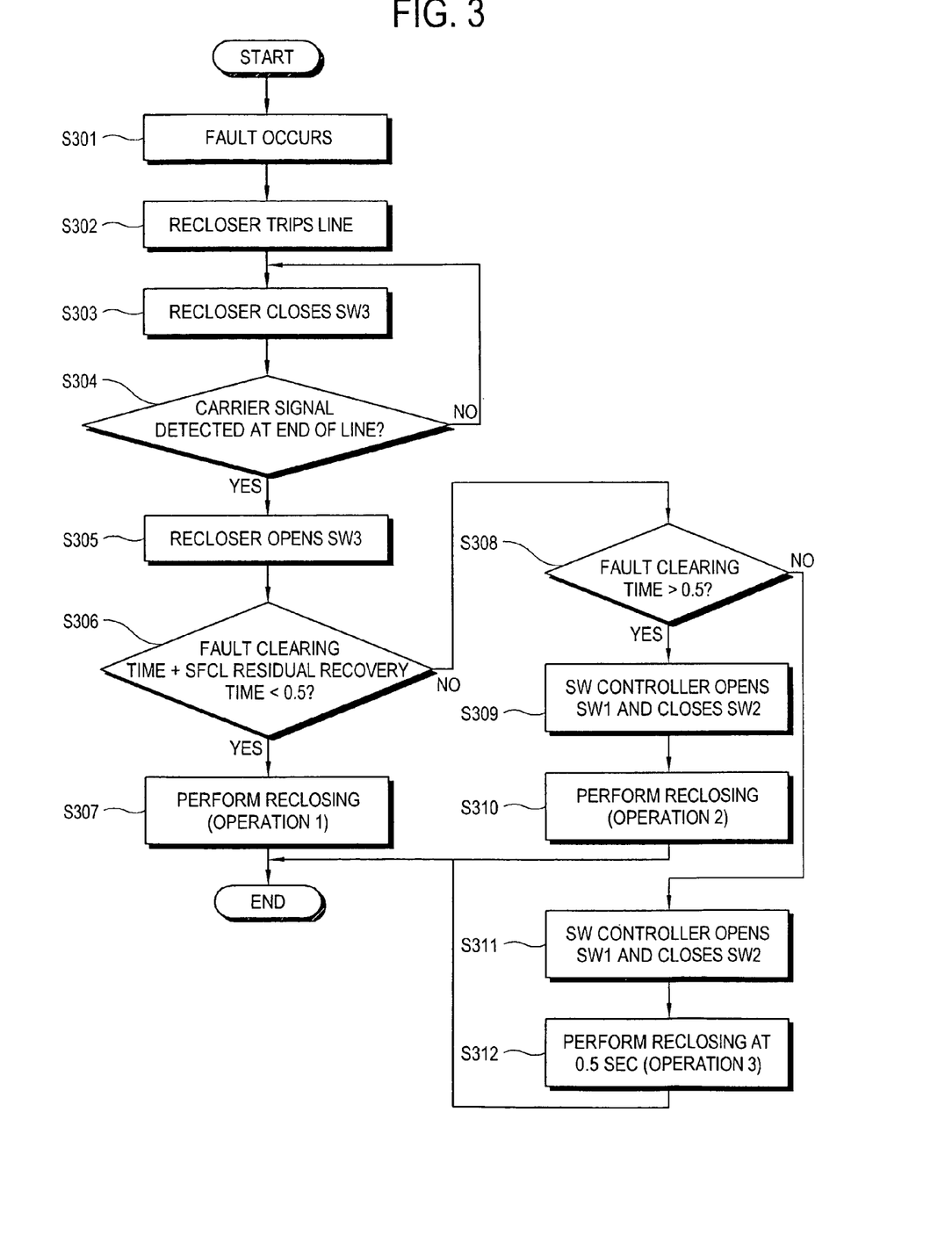
FIG. 3 is a flowchart showing a reclosing control method using a superconducting fault current limiter according to another embodiment of the present invention.

FIG. 3 is a flowchart showing a reclosing control method using a superconducting fault current limiter according to another embodiment of the present invention.

In a normal state, in the superconducting fault current limiting device 120 in which two SFCLs 123 and 124 are connected in parallel, only the first switch is closed. When a fault occurs at step S301, the recloser 140 instantaneously trips the line after a predetermined number of cycles have elapsed (for example, after 3 or 3.5 cycles) at step S302.

Further, simultaneously with the instantaneous tripping, the recloser closes the third switch 180, and then enables the carrier signal to be applied to the distribution line 160 at step S303. Since the applied carrier signal flows through the location of the fault for a fault duration, it is not detected on the second bus 170. In contrast, when the fault is cleared, the carrier signal flows to the second bus 170 through the distribution line 160.

Using these characteristics, the recloser can determine whether the fault has been cleared. That is, the recloser can detect the carrier signal by using variation in the effective value (or root mean square: rms) value of current at the end of the distribution line, that is, on the second bus, at step S304. When the carrier signal is detected on the second bus, the recloser opens the third switch, and then stops applying the carrier signal at step S305.

Thereafter, the recloser performs reclosing using different methods corresponding to a fault clearing time and the residual recovery time of the SFCL. In detail, the recloser determines whether the sum of the fault clearing time and the residual recovery time of the SFCL is less than 0.5 sec at step S306.

If it is determined that the condition at step S306 is satisfied, the recloser performs reclosing corresponding to Operation 1, which will be described later, at step S307.

Operation 1 refers to the case in which a condition of 'fault clearing time+residual recovery time of SFCL<0.5 sec' is satisfied. In Operation 1, the recloser 140 performs reclosing after the residual recovery time of the superconducting fault current limiting device 120 has elapsed. The reason for this is to ensure a time sufficient for the extinction of secondary arc while waiting for the residual recovery time of the SFCL to be terminated because the secondary arc generated by the capacitive coupling between a health phase and a fault phase is present anyways in the power distribution system although the magnitude of the secondary arc is very small.

Meanwhile, if the condition is not satisfied at step S306, the recloser determines whether the fault clearing time exceeds 0.5 sec at step S308. Based on a result of the determination, the recloser 140 performs reclosing corresponding to Operation 2 or Operation 3.

Operation 2 refers to the case in which a condition of 'fault clearing time (after the recloser trips)>0.5 sec' is satisfied. In operation 2, the fault is cleared after a time sufficient for the extinction of secondary arc has elapsed, and thus the recloser 140 performs a switching operation of opening the first switch 121 and closing the second switch 122.

The recloser 140 uses the second SFCL 124 being in a superconducting state, thus allowing the second SFCL 124 to be immediately connected to the system, without waiting for the recovery time of the first SFCL 123 being in a normal conducting state to be terminated, at step S310.

Operation 3 refers to the case in which a condition of 'sum of fault clearing time (after the recloser trips)+residual recovery time of SFCL>0.5 sec' is satisfied.

Operation 3 indicates the case in which the fault clearing time is less than 0.5 sec after the recloser trips, but the sum of the residual recovery time of the first SFCL 123 and the fault clearing time exceeds 0.5 sec. That is, this case means that the recovery time of the first SFCL 123 is long. However, such a long recovery time is not preferable, so that the recloser 140 performs switching to connect the second SFCL 124 being in a superconducting state by performing the switching operation described in Operation 2.

However, in this case, there is a need to consider the extinction time of the secondary arc, similarly to Operation 1, and thus the recloser 140 performs reclosing with a dead time of 0.5 sec.

Figure 4:
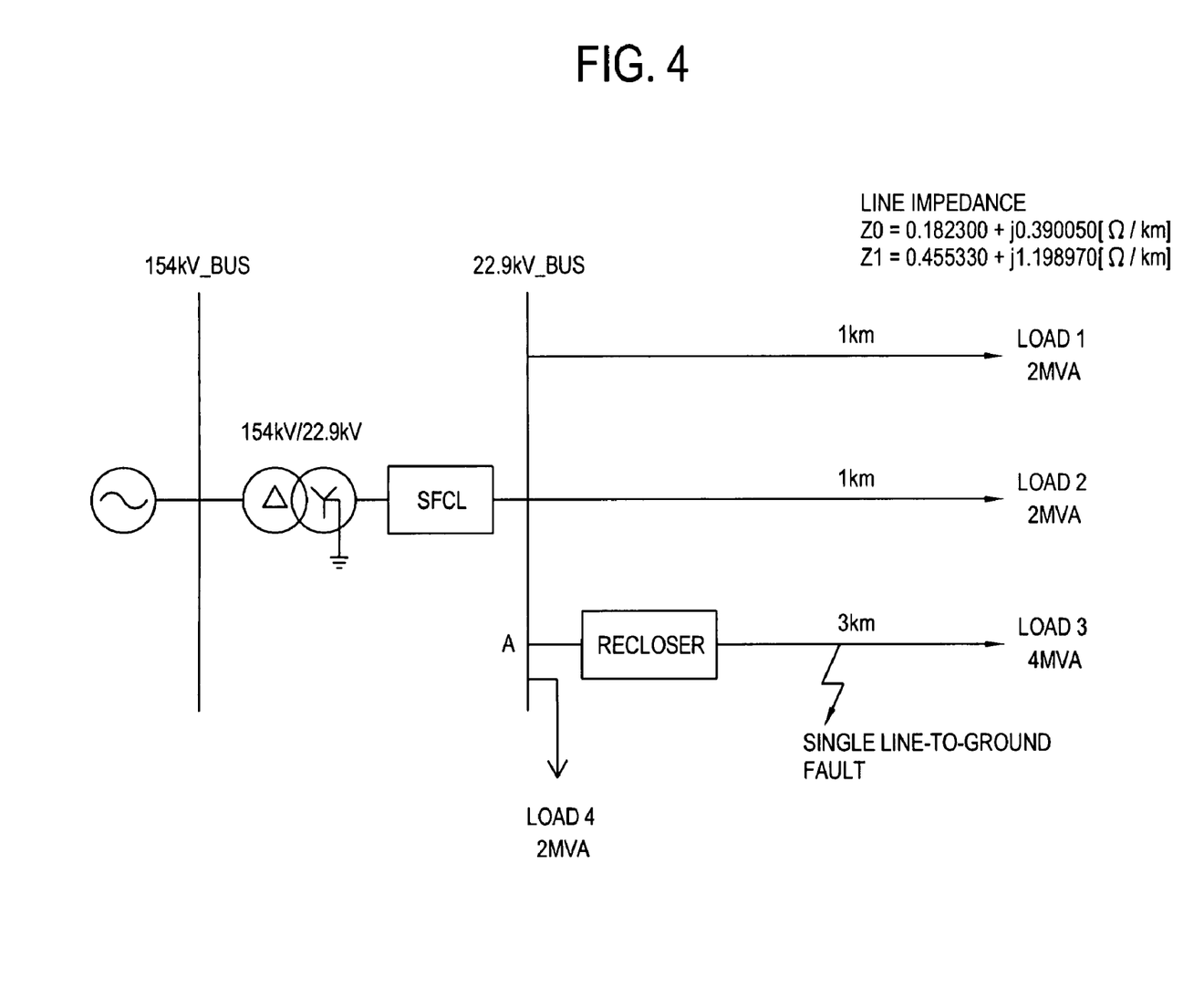
FIG. 4 is a diagram showing the construction of a power distribution system required to simulate the reclosing control method according to the present invention.

FIG. 4 is a diagram showing the construction of a power distribution system required to simulate the reclosing control method according to the present invention.

Meanwhile, Table 1 shows parameters required to implement the system for simulation.

TABLE 1

System parameter table

| Item | | Value |
|---|---|---|
| Source impedance | | $5 + j3[\Omega]$ |
| Line impedance | Positive sequence | $0.182300 + j0.90050[\Omega/km]$ |
| | Zero-sequence | $0.455330 + j1.198970[\Omega/km]$ |
| Line (feeder) length | Line 1 | 1[km] |
| | Line 2 | 1[km] |
| | Line 3 | 3[km] |
| Load power factor | | 0.9 |

As shown in Table 1, the source impedance of FIG. 4 is $5+j3[\Omega]$. Further, the zero sequence impedance $Z0$ of the line is $0.182300+j0.390050$ [$\Omega$/km], and the positive sequence impedance $Z1$ of the line is $0.455330+j1.198970$ [$\Omega$/km].

Meanwhile, the length of line 1, the length of line 2, and the length of line 3 are 1 km, 1 km, and 3 km, respectively.

Meanwhile, Table 2 shows the parameters of the Superconducting Fault Current Limiter (SFCL).

TABLE 2

Parameters of SFCL

| Item | Value |
| --- | --- |
| Quenching start current | 300[A]rms |
| Quenching time | 1[ms] |
| Fault current limiting resistance | 2[Ω] |
| Recovery time | Varies according to operation |

As shown in Table 2, in the simulation, the quenching start current of the SFCL was set to 300 [A]rms, quenching time was set to 1 [ms], and fault current limiting resistance was set to 2Ω. Meanwhile, the recovery time varies according to the above-described operation, which is set in detail in Table 3 below.

Table 3 shows simulation conditions for verifying a reclosing technique according to the present invention.

TABLE 3

Simulation condition table for verifying reclosing technique

| Operation | Fault resistance | Recovery time of SFCL | Fault clearing time |
| --- | --- | --- | --- |
| Operation 1 | 0 Ω | 0.3 s | 0.1 s after tripping |
|  | 30 Ω | 0.3 s | 0.1 s after tripping |
| Operation 2 | 0 Ω | 0.3 s | 0.7 s after tripping |
|  | 30 Ω | 0.3 s | 0.7 s after tripping |
| Operation 3 | 0 Ω | 0.7 s | 0.1 s after tripping |
|  | 30 Ω | 0.7 s | 0.1 s after tripping |

The conditions of the simulation of Table 3 are set such that the case where fault resistance is 0Ω and the case where fault resistance is 30Ω are set for each of operations.

In this case, Operation 1 refers to the case in which the sum of the recovery time of the SFCL and the fault clearing time is less than 0.5 sec. In order to satisfy this condition, in the simulation, the recovery time of the SFCL was set to 0.3 sec, and the fault clearing time was set to 0.1 sec after the recloser trips.

Similarly to Operation 1, Operation 2 refers to the case in which the fault clearing time exceeds 0.5 sec. In order to satisfy this condition, the recovery time of the SFCL was set to 0.3 sec identical to that of Operation 1, and the fault clearing time was set to 0.7 sec after the recloser trips.

Finally, Operation 3 refers to the case in which the sum of the recovery time of the SFCL and the fault clearing time exceeds 0.5 sec, but the fault clearing time is less than 0.5 sec after the recloser trips. It can be seen that, in order to satisfy this condition, the recovery time of the SFCL was set to 0.7 sec, and the fault clearing time was set to 0.1 sec after the recloser trips.

Figure 5:
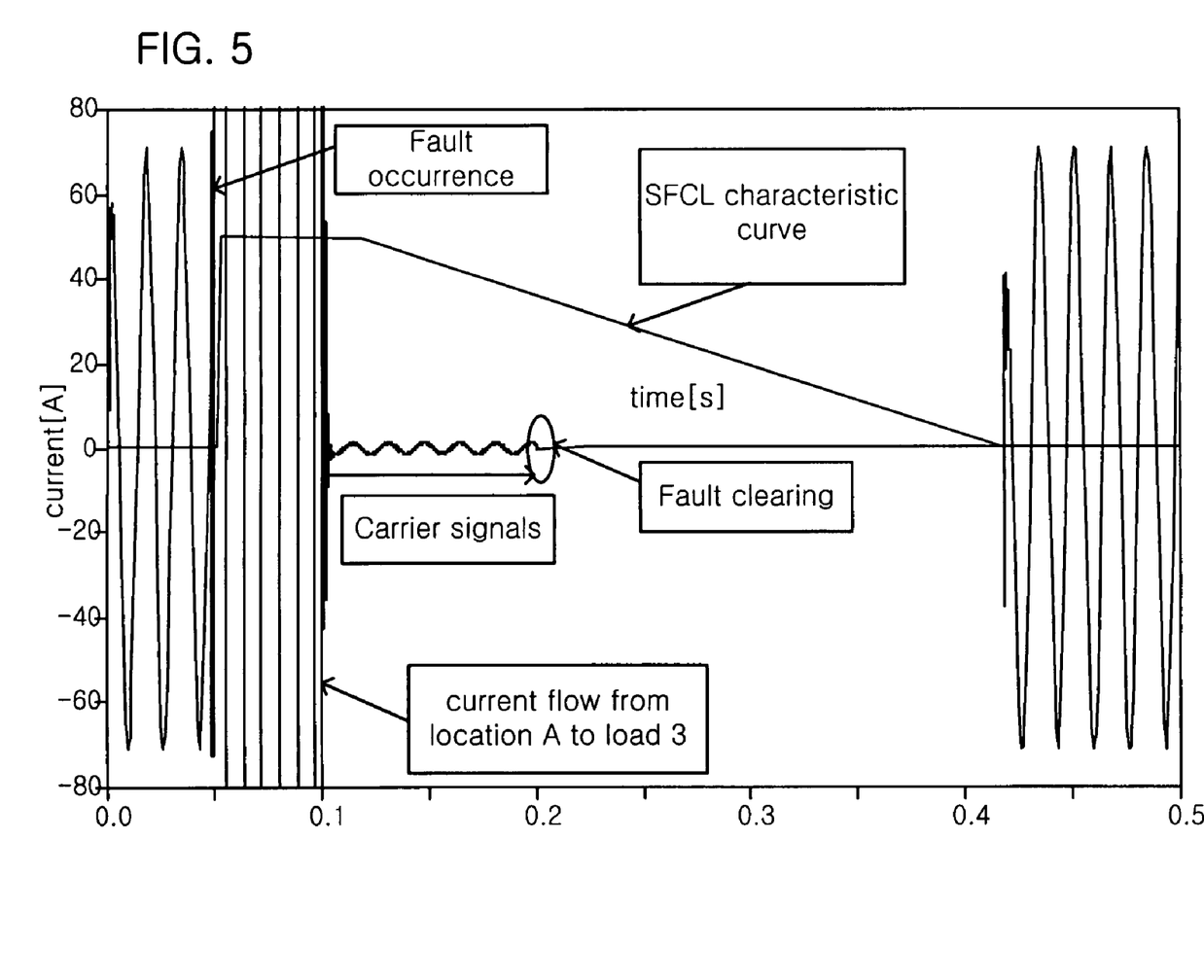
FIG. 5 is a diagram showing a resulting waveform of Operation 1 when fault resistance is 0Ω.
Figure 6:
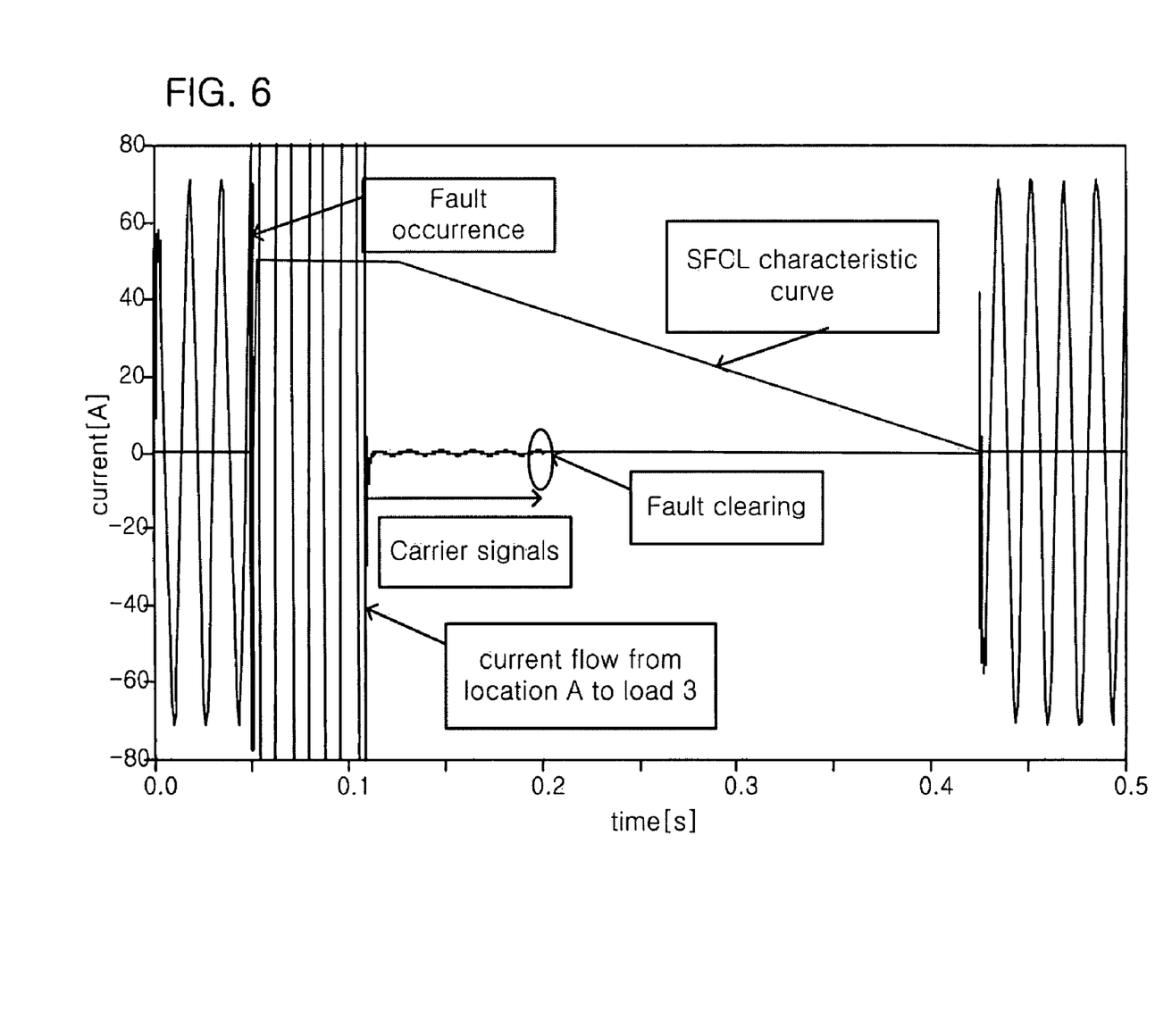
FIG. 6 is a diagram showing a resulting waveform of Operation 1 when fault resistance is 30Ω.

FIG. 5 is a diagram showing a resulting waveform of Operation 1 when fault resistance is 0Ω and FIG. 6 is a diagram showing a resulting waveform of operation 1 when fault resistance is 30Ω.

As shown in FIGS. 5 and 6, it can be seen that, from the time point at which the effective value of current becomes 0 after the recloser trips, a carrier signal flows. In this case, when the magnitudes of the carrier signals of FIGS. 5 and 6 are compared with each other, it can be ascertained that the magnitude of the carrier signal decreases as the fault resistance increases.

However, it can be seen that, even if the magnitude of the carrier signal differs according to the fault resistance, when the fault is cleared, the application of the carrier signal stops, and that, from the time point at which an SFCL characteristic curve becomes 0, current normally flows toward the load 3 of FIG. 4, and the recloser is operated in conformity with a reclosing technique according to the present invention.

Figure 7:
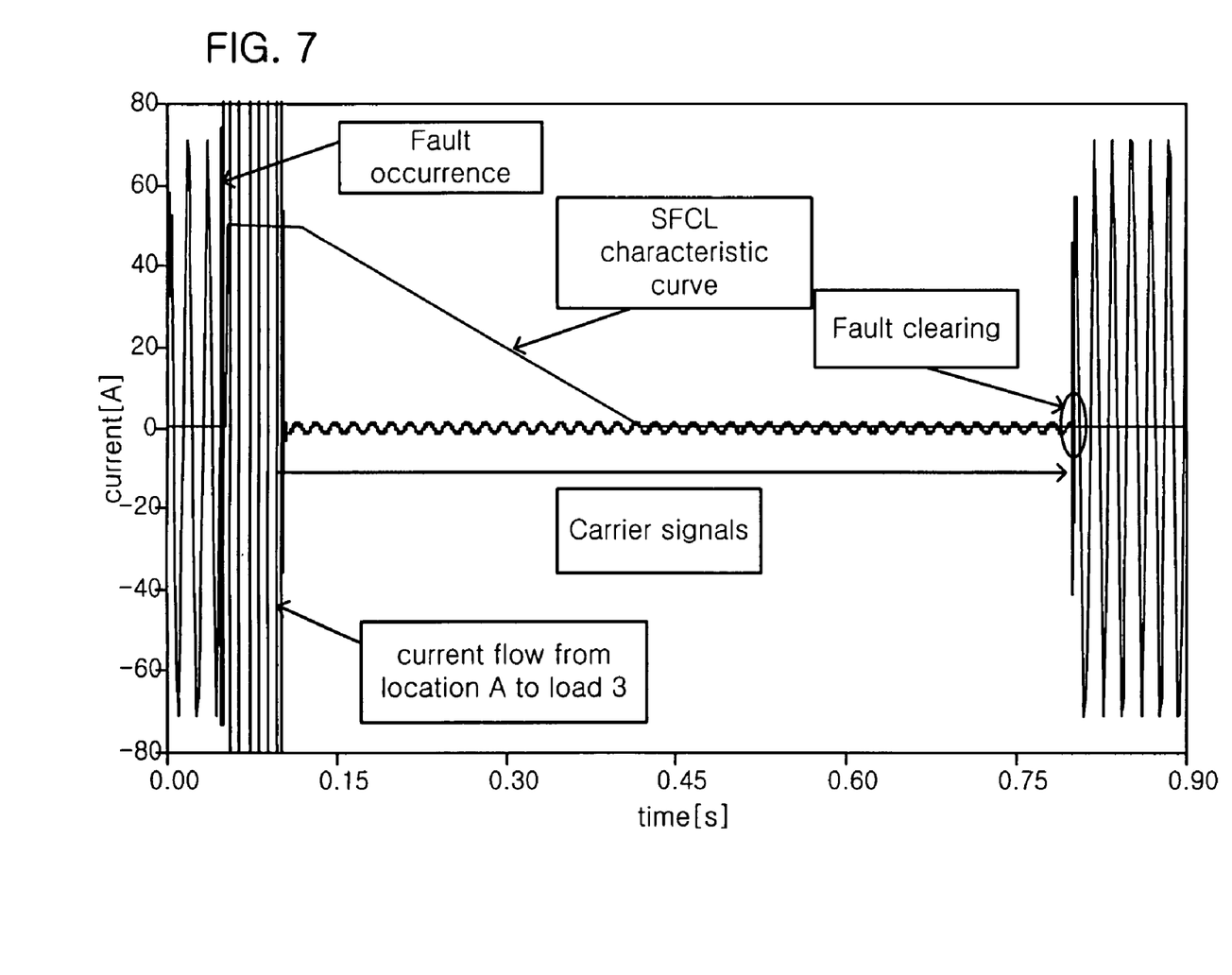
FIG. 7 is a diagram showing a resulting waveform of Operation 2 when fault resistance is 0Ω.
Figure 8:
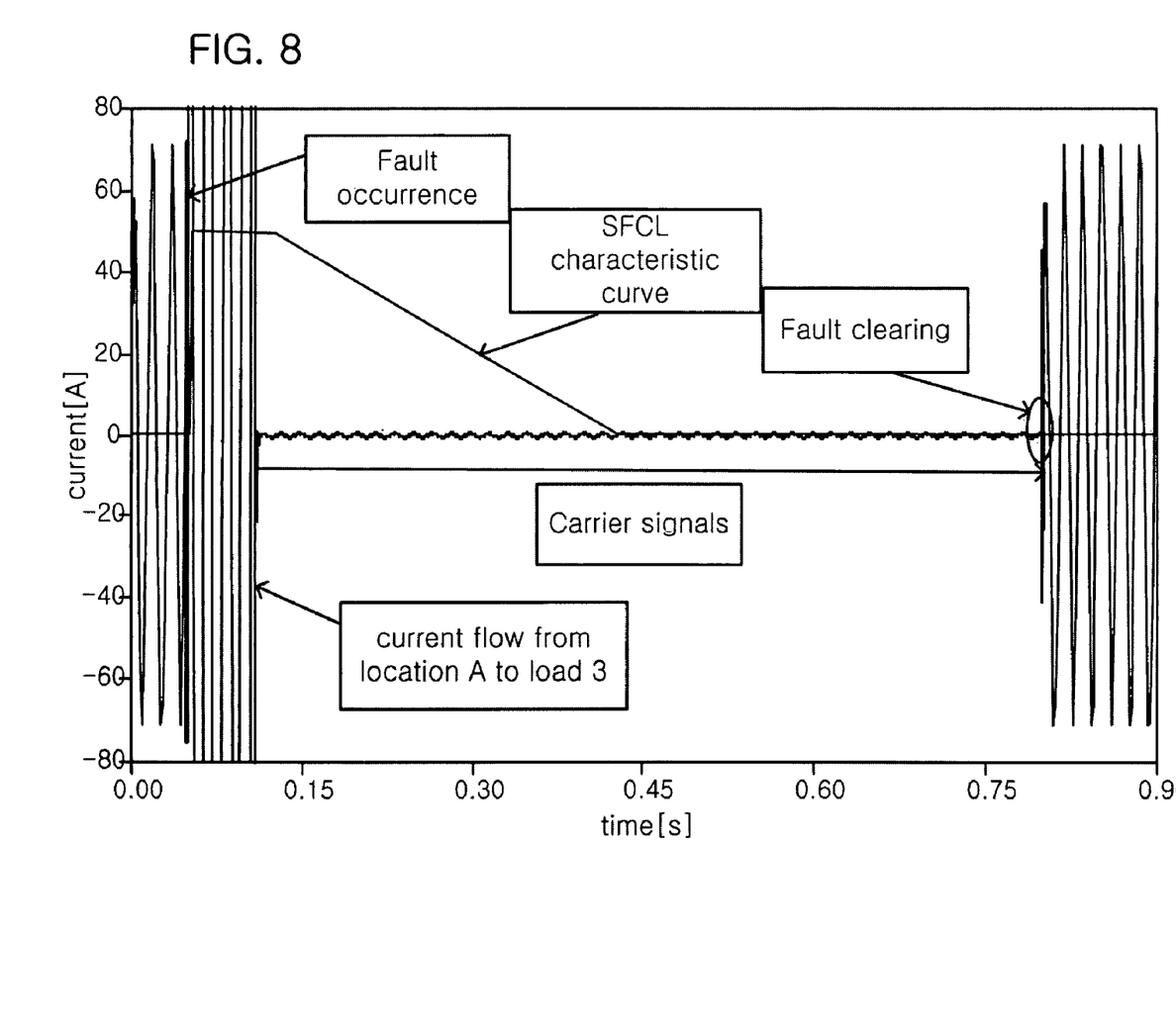
FIG. 8 is a diagram showing a resulting waveform of Operation 2 when fault resistance is 30Ω.

FIG. 7 is a diagram showing a resulting waveform of Operation 2 when fault resistance is 0Ω, and FIG. 8 is a diagram showing a resulting waveform of Operation 2 when fault resistance is 302Ω.

FIGS. 7 and 8 illustrate the cases of Operation 2. Operation 2 refers to the case in which the fault is cleared at 0.7 sec after the recloser trips. It can be seen in FIGS. 7 and 8 that the reclosing is performed immediately after the fault has been cleared, and the system is restored.

Figure 9:
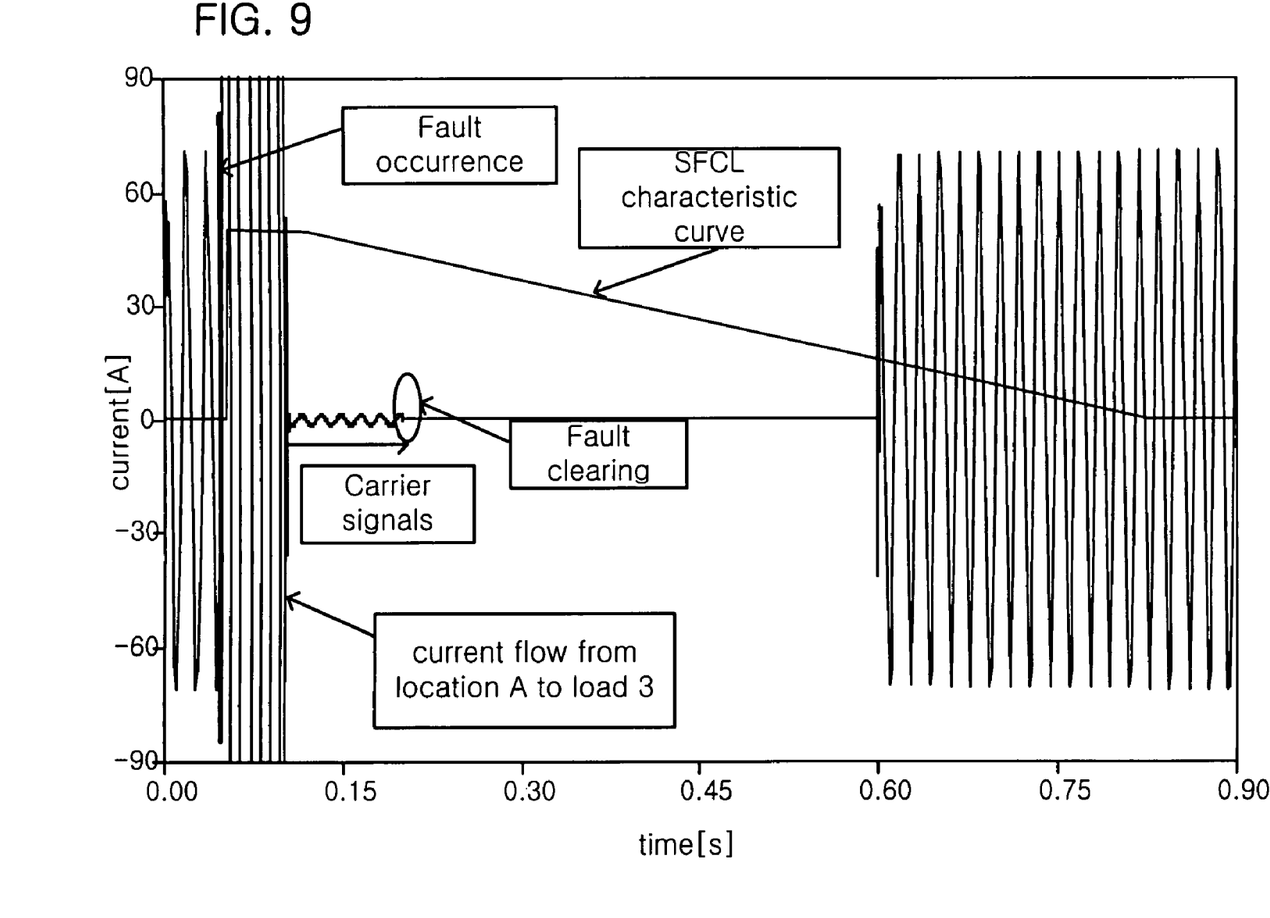
FIG. 9 is a diagram showing a resulting waveform of Operation 3 when fault resistance is 0Ω.
Figure 10:
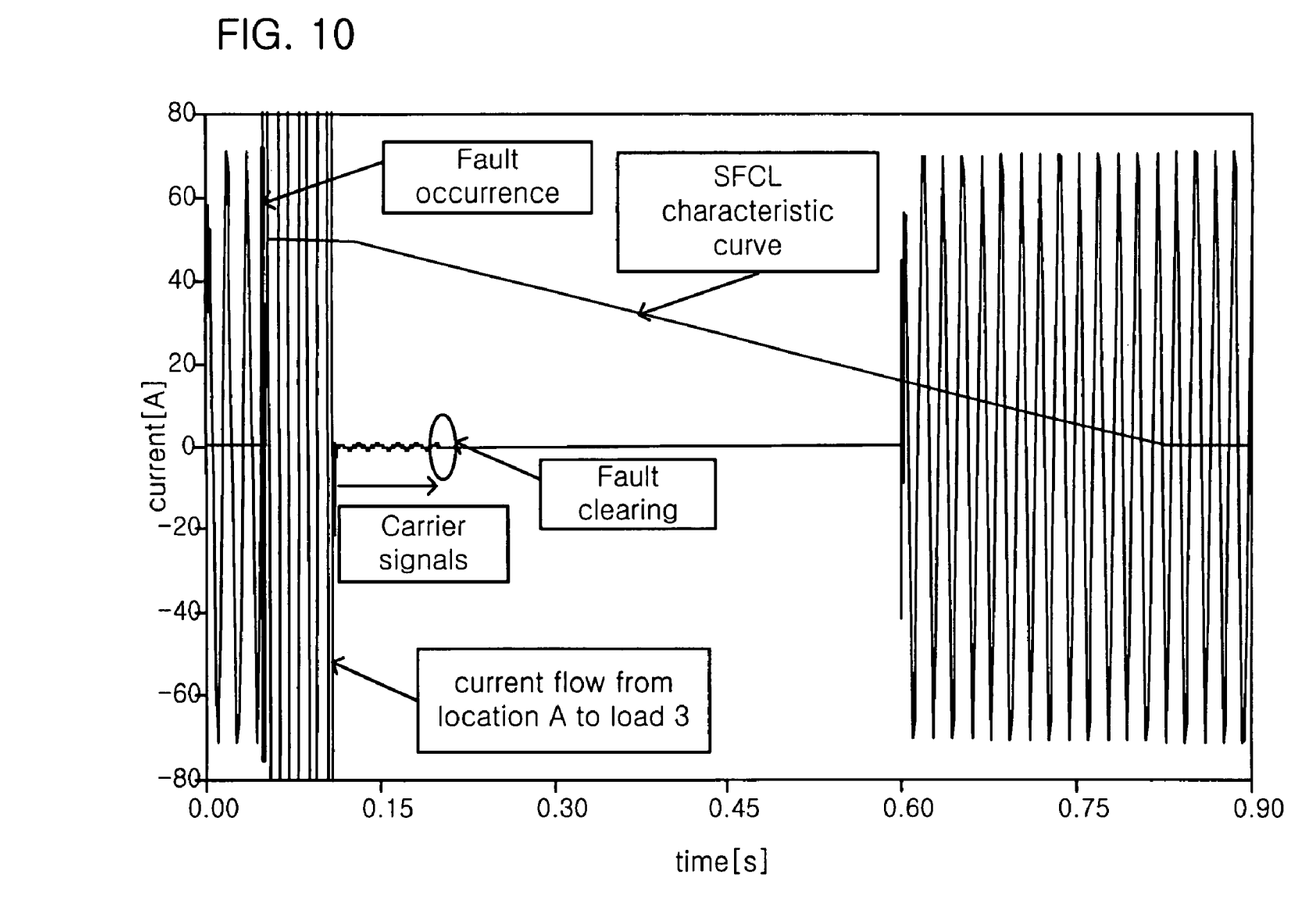
FIG. 10 is a diagram showing a resulting waveform of Operation 3 when fault resistance is 30Ω.

FIG. 9 is a diagram showing a resulting waveform of Operation 3 when fault resistance is 0Ω, and FIG. 10 is a diagram showing a resulting waveform of Operation 3 when fault resistance is 30Ω.

Operation 3 refers to the case in which a fault is cleared before 0.5 sec, but the recovery time of the SFCL is long, and thus the reclosing time exceeds 0.5 sec when the recloser takes into consideration even the residual recovery time of the SFCL.

As shown in FIGS. 9 and 10, the extinction time of the secondary arc is considered after the fault has been cleared, similarly to Operation 1. However, reclosing is performed after 0.5 sec from the termination of a switching operation, without waiting for the recovery time to be terminated. The recloser allows the second of the two SFCLs, connected in parallel with each other, to be immediately connected to the system.

As described above, a reclosing control system and method using the recovery time of a superconducting fault current limiter according to the present invention are advantageous in that whether a fault is permanent or transient is determined, and the effective and prompt reclosing of the system can be performed in consideration of the recovery time of the superconducting fault current limiter connected to the system to reduce a fault current.

Further, the reclosing control system and method according to the present invention are advantageous in that the problem of the conflict between the recovery time of a superconducting fault current limiter and the reclosing time of a recloser can be solved, thus affirmatively influencing the improvement of the reliability of a power distribution system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, the scope of the present invention should not be limited to the above embodiments, and should be defined by the accompanying claims and equivalents thereof.

What is claimed is:

1. A reclosing control system, comprising:
a superconducting fault current limiting device in which two circuits, each having a switch and a Superconducting Fault Current Limiter (SFCL) connected in series with each other, are connected in parallel with each other;
a recloser located between the superconducting fault current limiting device and a distribution line and configured to control reclosing; and
the distribution line connected to the recloser and configured to transfer power to a load,
wherein the recloser detects a fault clearing time by applying a carrier signal when a fault occurs on the distribution line, and performs reclosing considering the fault clearing time and a recovery time of a relevant SFC, wherein the distribution line is connected to a bus to supply power to the load, and the recloser determines whether the fault has been cleared by detecting the carrier signal on the bus, wherein the recloser detects the carrier signal by detecting variation in an effective value on the bus.

2. The reclosing control system according to claim 1, wherein the recloser performs control such that reclosing is performed after the recovery time of the SFCL has elapsed when a sum of the fault clearing time and the recovery time of the SFCL is less than a reference time.

3. The reclosing control system according to claim 1, wherein the recloser performs control such that reclosing is performed after switching the SFCL of the superconducting fault current limiting device after the fault has been cleared when the fault clearing time exceeds a reference time.

4. The reclosing control system according to claim 1, wherein the recloser performs control such that reclosing is performed after switching the SFCL of the superconducting fault current limiting device after a predetermined period of time has elapsed when the fault clearing time is less than a reference time and a sum of the fault clearing time and the recovery time of the SFCL exceeds the reference time.

5. The reclosing control system according to claim 1, wherein the recloser determines whether the fault has occurred by checking magnitude of current flowing from the superconducting fault current limiting device to the recloser.

6. A reclosing control method using a superconducting fault current limiter, comprising:
   a reclosing control system detecting a fault occurring on a distribution line;
   the reclosing control system, which detects the fault, tripping the distribution line;
   the reclosing control system determining whether the fault has been cleared by applying a carrier signal to the distribution line;
   the reclosing control system controlling reclosing in consideration of a fault clearing time and a recovery time of a Superconducting Fault Current Limiter (SFCL);
   the reclosing control system determining whether the fault has been cleared by applying the carrier signal to the distribution line, wherein the reclosing control system is configured such that the distribution line is connected to a bus to supply power to a load;
   the reclosing control system determining whether the fault has been cleared by detecting the carrier signal on the bus; and,
   the reclosing control system detecting the carrier signal by using variation in an effective value on the bus.

7. The reclosing control method according to claim 6, wherein the reclosing control system controlling reclosing in consideration of the fault clearing time and the recovery time of the SFCL is configured to perform control such that reclosing is performed after the recovery time of the SFCL has elapsed when a sum of the fault clearing time and the recovery time of the SFCL is less than a reference time.

8. The reclosing control method according to claim 6, wherein the reclosing control system controlling reclosing in consideration of the fault clearing time and the recovery time of the SFCL is configured to perform control such that reclosing is performed after switching the SFCL of the superconducting fault current limiting device after the fault has been cleared when the fault clearing time exceeds a reference time.

9. The reclosing control method according to claim 6, wherein the reclosing control system controlling reclosing in consideration of the fault clearing time and the recovery time of the SFCL is configured to perform control such that reclosing is performed after switching the SFCL of the superconducting fault current limiting device after a predetermined period of time has elapsed when the fault clearing time is less than a reference time and a sum of the fault clearing time and the recovery time of the SFCL exceeds the reference time.

10. The reclosing control method according to claim 6, wherein the reclosing control system detecting the fault occurring has occurred by checking magnitude of current flowing through a previous stage of the reclosing control system.

* * * * *